Dec. 19, 1933.                K. C. MONROE                1,940,264
           ELECTRIC HEADING MACHINE AND CONTROL THEREFOR
                      Filed March 11, 1931
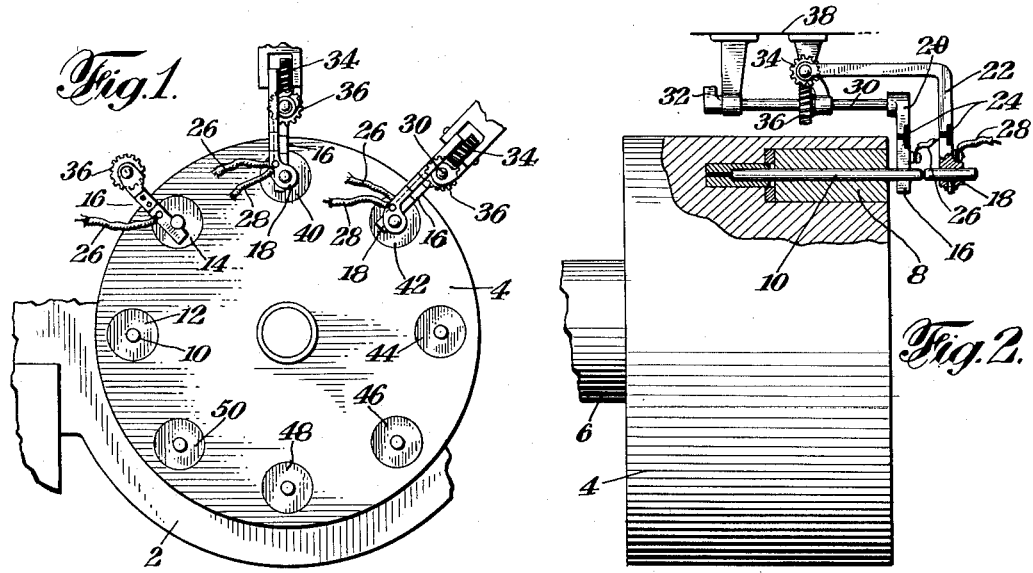
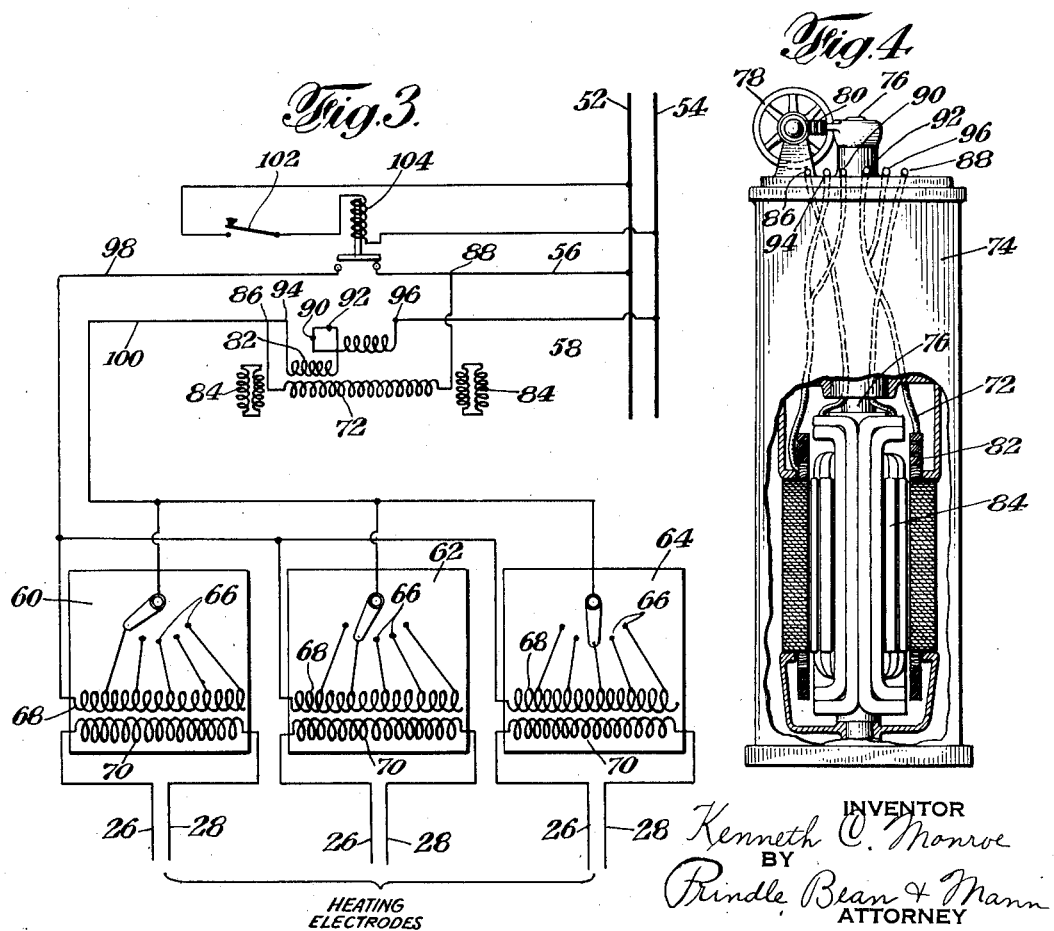

Patented Dec. 19, 1933

1,940,264

UNITED STATES PATENT OFFICE 1,940,264

ELECTRIC HEADING MACHINE AND CONTROL THEREFOR

Kenneth C. Monroe, Bridgeport, Conn., assignor to Bridgeport Brass Company, Bridgeport, Conn., a corporation of Connecticut Application March 11, 1931. Serial No. 521,742

2 Claims. (Cl. 219—11)

This invention relates to an electric header and means for operating it to keep a constant voltage on the work.

In the practical operation of electric machinery, many factories are supplied from a single power house and many machines, electric furnaces, etc., in each factory draw current from the power lines which run into the factory. The voltage on the power lines both within and without a factory, is subject to wide variations due to peak loads and this makes it extremely difficult to operate automatic machinery, particularly machines such as an electric header where electricity is used to run the machine and is also used to heat the rods or other pieces which are stamped in the machine.

The invention hereinafter set forth is intended to overcome the defects which arise in operating such a machine, due to fluctuations in the voltage of the power line. The fluctuations in voltage do not materially affect the speed of the motor which drives the mechanical parts of the machine, but the fluctuations materially affect the time in which the work blank can be brought up to the correct temperature for the die forming operations.

It will readily be understood that the heating of the work blank must take place in a predetermined length of time, so that it can be formed by the dies, and that the heating and the forming operations are worked in synchronism. The work blank must be heated to exactly the correct temperature in the time allowed for the passage of the electric current through it; if the work is too hot it is burnt and if it is not hot enough when the dies come against it, the work is spoiled or the dies are broken and there is a possibility that the entire machine may be broken. It is exceedingly important, therefore, to be able to regulate the voltage of the current applied to the work blank in a smooth curve with exceedingly small increments so that the work can be brought to exactly the correct temperature at exactly the right moment. In some cases less than three seconds is allowed to get the work to the correct temperature and consequently the voltage regulation of the heating current must be perfect. Furthermore, the machines use a large amount of power, and the regulator should be a non-resistance type, preferably a magnetic regulator which, although it enables the voltage to be changed in a smooth curve, consumes little or no power of itself.

Other objects and features of the invention will more fully appear from the following claims taken in conjunction with the description and the accompanying drawing in which one form of the invention is described and shown, but it is to be understood that these are merely for the purpose of illustrating an operative form of the invention which is not to be limited to that particular form.

In the drawing:

Fig. 1 shows a face view of the work head of the machine.

Fig. 2 is a side view of Fig. 1.

Fig. 3 is a diagram of the circuit used, and,

Fig. 4 is a side view with the casing partially broken away, of a regulator adapted to be used in the circuit shown in Fig. 3.

The invention may be applied to any of the usual forms of electric headers, which are therefore illustrated only diagrammatically in the Figures 1 and 2 of the drawing, in which 2 represents the frame of the machine and 4 is the revolving work head. The work head 4 is usually fast to and revolves with the shaft 6 which is driven by gears, etc., within the machine, which gears, etc., are not shown. The head 4 contains a number of receptacles, 8 in each of which a work blank 10 is automatically placed at the beginning of the operations and from which it is ejected at the end thereof. The head shown in the drawing contains eight receptacles. A cold blank 10 is inserted in the receptacle in the position 12. The head then revolves to the position 14 and the two electrodes 16 and 18 are brought into contact with it so that only the end of the blank 10 is heated. The electrodes are mounted on arms 20 and 22 but are insulated therefrom by the insulation 24. Current is brought to the electrodes by the wires which are denoted generally at 26 and 28. The arm 20 of the electrode 16 may be mounted on a horizontal shaft 30 which is moved from a rocker 32 at the proper time by other parts of the machine, and the arm 22 may be fast to the gear 34 which is driven by the spiral gear 36 on the shaft 30 so that by moving the rocker arm 32, the electrode 16 is swung from left to right (Fig. 1) to be brought in contact with the work blank or to be moved out of the way so that the head may revolve to bring the work blank from the position 12 to the position 14. Similarly the electrode 18 is moved up or down in a vertical plane to remove the electrode from the blank or bring it in contact with the work. The electrodes may conveniently be supported from a beam 38 above the revolving head.

When the work blank is in position 14, a current of low voltage is passed through it in order to warm it. The electrodes are then removed from all of the work blanks and the head advances one step until the work piece moves into the position 40 where the next set of electrodes come in contact with it and it is further heated. The electrodes are again removed from the work blank and the head carries it into the position 42 where another pair of electrodes are brought in contact with it and it is heated to the correct temperature for the forming operations which take place at the positions 44, 46 and 48. The finished piece is then ejected at position 50 and the empty receptacle is ready to take a cold blank when it again moves into the position 12.

When the work blank is in the position 42 it must be brought to exactly the right temperature within the time that the electrodes are in contact with it, the time of contact being determined by the speed of the motor which drives the machine. The speed of the driving motor and therefore the speed of the machine is very slightly affected by fluctuations on the power lines, but the heating of the work blank is greatly affected by the fluctuations of voltage of the power lines and therefore, a regulator must be used to control the voltage at the position 42.

The electric current for the heating is brought in to the work electrodes from the main power lines 52 and 54 which usually operate at 220 volts. The machine power lines 56 and 58 conduct the current to a series of transformers 60, 62 and 64, which may be connected in parallel and preferably have a plurality of contacts 66 to connect a variable number of turns of the primaries 68 in the circuit. The secondaries 70 of each transformer deliver current through the wires 26 and 28 to the electrodes, one transformer being connected to each pair of electrodes. Such an arrangement of transformers will enable the temperature of the work to be governed to some extent but the regulation is not close enough to enable the work to be heated to the exact temperature which is necessary whenever the voltage on the power lines changes, because the voltage on the power lines is always subject to increments of variation.

It is, therefore, necessary to use a regulator in the power lines 56 and 58 which will offset the variations in the main power lines 52 and 54. This regulator is preferably an induction voltage regulator having two power windings which are so placed that one winding induces a voltage in the other and which are movable with respect to each other so that the magnetic flux can be varied and the voltage can be changed in a smooth curve. The voltage regulator operates on a magnetic principle and uses a negligible amount of power. The primary winding 72 of the voltage regulator is connected across the lines 56 and 58 and is mounted within the casing 74 on a rotor shaft 76 which can be moved by a hand wheel 78 through a gear and sector 80 to rotate the primary windings with respect to the secondary windings 82 which are stationary within the casing. Short circuited windings 84 on the rotor shaft 76 are used to overcome the choking effect of the magnetic flux which is set up by the line current flowing through the secondary windings which, if not neutralized, would lower the power factor in the feeder circuit. The secondary winding is usually in two parts which can be connected in series or in parallel, but are here shown as connected in series. The outlets 86 and 88 of the primary are connected across the power lines 56 and 58, the outlets 90 and 92 of the secondaries are connected together and the outlets 94 and 96 are connected in series with one side of the power line, which may be the wire 58. By moving the hand wheel 78, the rotor 76 is moved to change the position of the primary windings 72 with respect to the secondary windings 84 and this either raises or lowers the voltage in the wires 98 and 100 which lead from the regulator into the primaries of the work transformers 60, 62 and 64. The hand wheel 78 can be moved as little or as much as is desired and consequently the voltage induced in the secondary can be changed by small increments of voltage to raise or lower the voltage in the lines 98 and 100, thus enabling the amount of electricity forced through the work blank 10 to be changed in as small an amount as desired to heat the work blank to exactly the right temperature.

Whenever the electrodes are removed from the blank, the entire heating circuit of the machine is interrupted so that no current is flowing through the electrodes when they are removed from or brought in contact with the work pieces. The breaking of the circuit before the removal of the electrodes is to prevent the formation of arcs which would burn the work. For this purpose a switch 102 is operated by a cam or other part of the machinery (not shown) and this controls a magnetic switch 104 which opens or closes the circuit to the transformers 60—64.

Although a particular and preferred form of the invention has been described, it is recognized that various modifications may be made and it is desired that the invention be construed as broadly as the claims taken in conjunction with the prior art may allow.

What I claim is:

1. A machine for heating a work blank in successive stages cumulatively from alternating current power lines comprising, means for intermittently feeding a work blank to successive heating stations, electrodes at each station for contacting the blank; transformers, one for each station, their secondaries being individually connected with the electrodes at the several stations and their primaries being individually adjustable to vary at will the number of active turns therein whereby the cumulative effect on the work blank of the successive heating stations at a standard voltage may be adjusted to heat the blank to a desired temperature; and an induction voltage regulator connecting the power lines to said primaries in multiple and operable to deliver said standard voltage.

2. The machine defined in claim 1 further comprising, in combination, switch means connected for automatic operation by the machine to interrupt the current before the electrodes are disconnected from the work blank at the respective stations.

KENNETH C. MONROE.